UNITED STATES PATENT OFFICE.

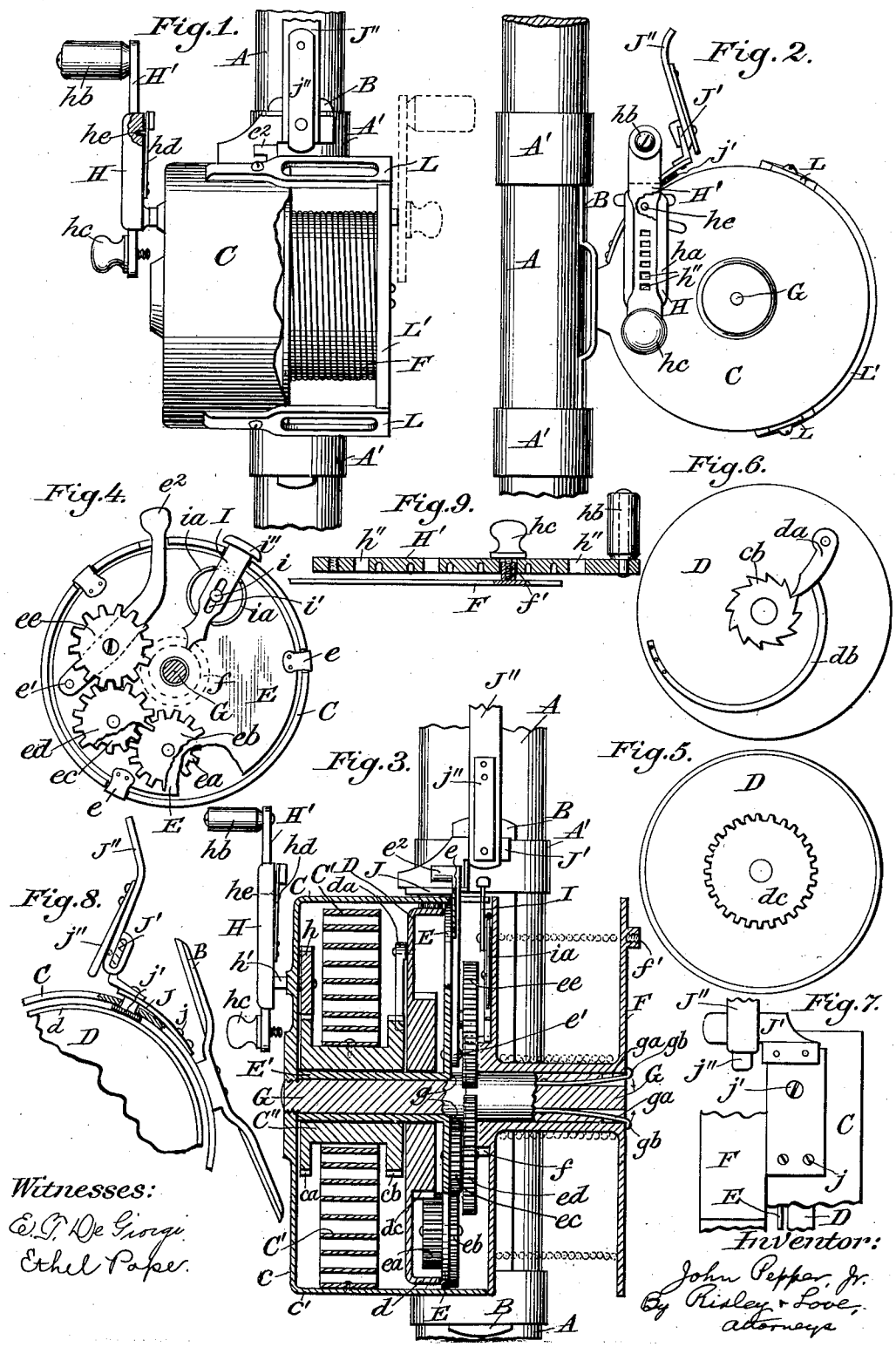

JOHN PEPPER, JR., OF UTICA, NEW YORK.

REEL.

No. 841,891. Specification of Letters Patent. Patented Jan. 22, 1907.

Application filed June 15, 1905. Serial No. 265,333.

*To all whom it may concern:*

Be it known that I, JOHN PEPPER, Jr., a citizen of the United States, residing at Utica, in the county of Oneida and State of New York, have invented certain new and useful Improvements in Reels, of which the following is a specification, reference being had therein to the accompanying drawings.

My invention relates to an improved reel; and I declare that the following is a full, clear, concise, and exact description thereof sufficient to enable one skilled in the art to make and use the same, reference being had to the accompanying drawings, in which like letters refer to like parts throughout.

My invention discloses a device which is readily adaptable to use as a simple reel or spool to wind a line upon by the use of a handle mounted on the spool of the reel or by throwing the spool and the other parts of the reel into connection. The paying out of the line may be utilized to put the spring under tension, or this may be done by means of the handle when on the face or side of the reel adjacent the gears. The tension of the spring may be released at any time, either in or out of connection with the spool. In short, the reel may at any time be used operating the spool independently, the spring may be manipulated independently, and the spring and the spool may be connected or disconnected at will. It is particularly serviceable because of its compact and simple construction and because it can be readily opened and the parts separated for cleaning and repair, as well as because of the variety of its uses.

In the drawings, Figure 1 is a view of a rod with the reel mounted thereon looking across the axis of the reel, parts broken away. Fig. 2 is a side view of the same. Fig. 3 is a middle section view of the reel in the same position as in Fig. 1, showing some gears in full view, however. Fig. 4 is a plan view of a plate or disk, a part of the reel which carries part of the gears, part of the plate, and of the gears broken away; and Figs. 5 and 6 are views of opposite sides of another plate. Fig. 7 is a detail view of the brake of the reel. Fig. 8 is a side view of the brake portion mounted on the case; and Fig. 9 is a sectional longitudinal view of a portion of the handle, showing the same mounted on the spool.

Referring to the drawings in detail, A shows a fish-rod having the usual bands or rings A' to engage the reel-base B. In short, the reel here shown in illustration of my invention comprises a fixed case C, a revolving plate D, which may be revolved under tension of the spring C' or be held by the brake, a fixed plate E, with gears thereon, and a spool F, with a centrally-fixed shaft or stud G. The case C is fixed to the reel-base B and has face $c$ and side $c'$, the face $c$ being screw-bored to receive shaft G. Line-guides L are provided, which may be mounted on the case, having their other ends connected by band L'.

On the inner surface of the side $c'$ is fixed one end of spring C', the other end being fixed to a sleeve C'', which is centrally bored to fit loosely on an inner sleeve E', which is secured to plate E and within which is shaft G—that is, shaft G is secured in the fixed case C, passing through sleeve E' of the fixed plate E, the plate D being revolubly mounted on the sleeve E', and the sleeve C'', which holds one end of the spring C', being also revolubly mounted on the sleeve E'. The sleeve C'' has fixed thereto or integral and at the end next the face of the case a gear $ca$ and at the opposite end a ratchet-wheel $cb$, the former of which is engaged by a gear $h$, supported on the handle-stud and by which the spring is wound. The sleeve C'' and the gear $ca$ and the ratchet-wheel $cb$ will turn together to wind the spring. A dog is provided on the plate D to engage ratchet-wheel $cb$ and hold the inner end of the spring so that it can be put under tension, the brake holding it by contact with the edge of plate D.

The plate D is centrally bored to fit loosely on the sleeve E', through which shaft G passes. It has an annular upset edge $d$, which extends far enough to provide a surface for the brake to bear upon. On one surface of the plate is a toothed dog $da$ to engage ratchet-wheel $cb$, being held thereto by spring $db$, fixed at the other end to the face of the plate. On the other surface of the plate is centrally fixed or integral toothed gear $dc$. The brake to be described bears on the side of this plate, which is thus held when the spring is to be put under tension, but which turns freely when the spring is unwound after being put under tension or when the handle is turned farther in the same direction to back up the spring.

The plate E has fixed thereto a sleeve E', which extends through plate D and sleeve C'' to the case C. On its periphery it has ears or lugs $e$, which engage in the wall of the case to hold the plate in fixed position. On its inner face is a pinion *ea*, mounted to engage gear *dc*, and on the other face of the plate on the same stud is gear *eb*. Thus the action of the spring when released from tension will turn sleeve C″ and also through engagement of the ratchet-wheel *cb* and the dog *da* the plate D (when the brake is off) and the gears on plate E.

Gear *eb* meshes with pinion *ec* (shown in dotted lines under gear *ed*, Fig. 4) and turns gear *ed*. Gear *ee* is pivoted on a bar *e'*, pivoted on the plate at one end and extending through the case in button $e^2$. In this way gear *ee* may be put into mesh with gear *ed* and also with pinion *f*, mounted or integral on the inner face of spool F and indicated by dotted lines in Fig. 4.

To illustrate the operation of the device, suppose that we are looking at the reel from the spool side—the side shown in Fig. 4—and the handle and its gear or pinion *h* are turned to the right, the brake being at lock. The spring by the turning of sleeve C″ to the left is thus put under tension. The brake being then unlocked or taken off, sleeve C″ turns to the right (pinion *h* to the left) and plate D to the right, (by engagement of dog *da* with ratchet-wheel *cb*,) as also gear *dc*. Pinion *ea* and gear *eb* turn to left, *ed* to right, *ee* (when in mesh) to left, and *f* and spool F to right, which we assume winds the line. Gear *ee* may be at any instant put out of mesh, and the spool is then unaffected by any action of the spring, which may independently be put under tension by the handle and released by lifting the brake, the spool being connected or disconnected at will. The turning of the handle may be utilized merely to put the spring under tension when gear *ee* is out of mesh with pinion *f* and the brake is on, and connecting the gear and pinion and releasing the brake will then wind the line.

I is a clicker pivotally mounted on stud *i* and slotted at *i'*, so that by button *i''* it can be drawn out of contact with pinion *f* or be put into such contact to govern the speed of the spool and give warning of any movement of the line. Spring means *ia* is provided to keep it in normal middle position, the ends bearing against opposite sides of the inner end of the clicker.

The spool F is of ordinary construction, being centrally bored to revolve on shaft G and having on its inner face centrally mounted or integral pinion *f*, as described. On its outer face it has a small angular stud *f'*, to be explained.

The shaft G has a shoulder *g*, which serves to keep in place plate E and the parts which it incloses in the case C. At its outer end it has one or more springs *ga*, which lie within the body of the shaft, terminating in button *gb*, overlying the central bore of the spool when it is on the shaft to hold it in place, but which may be pressed inward to permit the spool to be removed, after which the shaft G can be unscrewed and the several parts of the reel dismounted.

The handle is extensible and removable and as here shown comprises the stud *h'*, on which is secured arm H, with edges *ha* upset to secure bar H' to slide therein and which has knob *hb* and screw-stud *hc*. Under arm H is spring *hd*, with pin *he* to engage holes in bar H' to hold the latter in such extended position as desired.

The arm H' has square openings *h''* to receive square stud *f'* on the spool and be held thereon in the desired extension by the screw-stud *hc*, screwed into stud *f'*, so that the spool can be used as a simple reel.

The brake is best seen in Fig. 7. It comprises spring J, secured at *j* to the case C, which is cut away to permit shoe (shown by *j'*) to contact with edge *d* of plate D, the spring normally effecting the contact. It has bracket-arm J' secured to it and which carries the brake-handle J″, by which the brake can be lifted from contact. The handle is looped to slip onto the bracket and has spring *j''*, with a pin to engage the bracket, so that by pressing the spring out the handle can be removed for convenience in the use of the reel when it is above the rod-grip.

Having described my invention, what I claim as new, and desire to secure by Letters Patent, is—

1. A fish-reel comprising a fixed case, a stud fixedly mounted in the case and adapted to revolubly support a spool, a spring within the case being fastened at one end to the case and at the other end to operative connections between the spring and the spool, and means for holding the tension applied to the spring.

2. In a reel comprising a case and a spool with separative operative connections therebetween, a spring fixedly mounted at one end within the case and at the other end attached to a sleeve in engagement with a member of the said operative connections, a sleeve, a lever, a gear mounted on the lever and adapted to be moved by the lever to disconnect the said operative connections from the spool, substantially as described.

3. A reel comprising a case adapted to be fixedly supported on a pole and having an arbor centrally mounted thereon, a sleeve mounted to revolve about the arbor, a spring connected to the case at one end and to the sleeve at the other end, handle means for winding the spring, means for engaging the sleeve to hold the spring under tension, and a spool revolubly mounted on the arbor and operatively connected with the said sleeve by means of gears, one of said gears being adjustably mounted to permit its being swung in or out of engagement with the train.

4. In a reel, a case adapted to be fixedly supported on a pole, an arbor mounted in the case, a sleeve mounted to revolve on the arbor, a spring connected at one end to the case and at the other end to the arbor, a plate provided with means to engage the said sleeve, means to hold the plate against turning under the tension of the spring, a spool revolubly mounted on the arbor, gears operatively connecting the plate with the spool, said gears comprising a member mounted to be swung in or out of engagement to make or break the connection between the spring connections and the spool.

5. In a reel comprising an arbor, a spool revolubly mounted thereon and a case, a spring mounted in the reel with operative connections at one end with the case, a sleeve revolubly mounted about the arbor having the other end of the spring connected therewith and means for turning said sleeve whereby the spring may be wound by the turning of the spool and the unwinding of the line, and operative connections between the spool and the sleeve.

6. In a reel comprising a fixed case, an arbor and a spool revolubly mounted thereon, a spring attached to the case at one end and at the other end attached to a sleeve revolubly mounted on the arbor, said sleeve, operative connections between the sleeve and the spool whereby the spring may be wound by the turning of the spool, the said operative connections having a movable member adapted to make or break the connection between the spool and the sleeve.

7. In a device of the character described, a fixed case and a reel portion, the latter comprising a spool and an arbor, a sleeve mounted on the arbor, a spring operatively connected at one end to the case and at the other end to the sleeve, handle means for turning the sleeve whereby to wind the spring, operative connections between the reel and the sleeve whereby to wind the spring, and means intermediate the spring and the spool to engage said connecting means to hold the tension of the spring.

8. In a reel, an arbor and a spool revolubly mounted thereon, operative connections within the reel for turning the spool by the operation of the handle, and a handle removably mounted on the outer face of the reel, and a separate stud on the spool for the mounting of the handle thereon.

9. In a reel comprising a fixed case, an arbor mounted thereon and a spool mounted on the arbor, a spring member mounted on the arbor to engage the spool but adapted upon its compression to permit the removal of the spool from the arbor.

10. In a reel, an arbor or shaft fixedly mounted and adapted to revolubly support a spool, means normally holding the spool on the shaft but manually operative to release the spool whereby it may be removed from the reel, substantially as described.

11. In a reel comprising a case member with a central shaft mounted therein, a spool revolubly mounted on the shaft, a spring and means for winding the spring, means normally holding the spool in operative position on the shaft and manually operative to permit the removal of the spool, substantially as described.

12. In a reel comprising a case, a spool, a spring, and operative connections between the spring and the spool with means for disconnecting the spool from operative connection with the spring members of the reel, an extensible handle adapted to be interchangeably mounted either on the case to operate the spring-connected parts or on the spool to operate it, substantially as described.

In testimony whereof I affix my signature in presence of two witnesses.

JOHN PEPPER, Jr.

Witnesses:
  E. T. De Giorgi,
  Arthur B. Vincent.